United States Patent [19]

Hsu

[11] Patent Number: 5,400,396

[45] Date of Patent: Mar. 21, 1995

[54] THEFT PROOF PAY PHONE

[76] Inventor: Chen-Yun Hsu, 64 Ormonde Blvd., Valley Stream, N.Y. 11580

[21] Appl. No.: 2,429

[22] Filed: Jan. 8, 1993

[51] Int. Cl.$^6$ .......................................... H04M 17/00
[52] U.S. Cl. .................................... 379/145; 379/143; 379/149; 379/150
[58] Field of Search ............... 379/143, 145, 149, 150, 379/155, 437; 194/202, 203, 204

[56] References Cited

U.S. PATENT DOCUMENTS

| 4,396,106 | 8/1983 | Mehlan et al. | 194/97 |
| 4,721,197 | 1/1988 | Hoffman | 194/235 |
| 4,942,954 | 7/1990 | Nesser et al. | 194/351 |
| 4,946,095 | 8/1990 | Anello et al. | 379/145 |
| 5,018,193 | 5/1991 | DeArkland | 379/145 |
| 5,088,587 | 2/1992 | Goodrich et al. | 194/351 |
| 5,146,492 | 9/1992 | Stone et al. | 379/437 |
| 5,148,476 | 9/1992 | Zausner | 379/143 |
| 5,193,113 | 3/1993 | McGough | 379/437 |

Primary Examiner—Stephen Chin
Assistant Examiner—Vijay Shankar
Attorney, Agent, or Firm—Galgano & Burke

[57] ABSTRACT

Apparatus to prevent the theft of coins in the coin return channel of pay phones and coin vending machines. Three vanes are pivotally mounted within or adjacent the return channel to provide a bypass path for returned coins so that blocking of the coin return door or the use of a wire attached to a coin for inserting a wad of material will not prevent retrieval by a user of the telephone or vending machine.

2 Claims, 4 Drawing Sheets

THEFT PROOF PAY PHONE

TECHNICAL FIELD

This invention relates to pay phones and more particularly to means to prevent theft of coins in the coin return channel.

BACKGROUND

Pay phones are common in public places and all have a coin return channel. Thieves have various means of blocking the coin return channel with wads of paper, gum, etc. Then periodically they remove the blocking material and steal the coins.

PRIOR ART

No prior art is known.

THE INVENTION

In a pay phone of the type receiving coins and having a coin return channel, means to prevent blocking of the coin return channel, comprising at least one vane, pivotally mounted in the coin return channel to prevent blocking of the coin return channel.

OBJECTS OF THE INVENTION

A principal object of the invention is to provide a new and improved theft proof pay phone.

Another object of the invention is to provide a new and improved theft proof pay phone having means to provide blockage in the coin return channel.

Another object of the invention is to provide a new and improved theft proof pay phone having means to prevent blockage in the coin return channel and having means to bypass blockages so that the coin can be returned.

Another object of the invention is to provide a pay phone, or coin vending machine of the type receiving coins and having a coin return channel, means to prevent blocking of the coin return channel, comprising at least one vane, pivotally mounted in the coin return channel to prevent blocking of the coin return channel.

BEST MODE OF THE INVENTION

Figure 1:
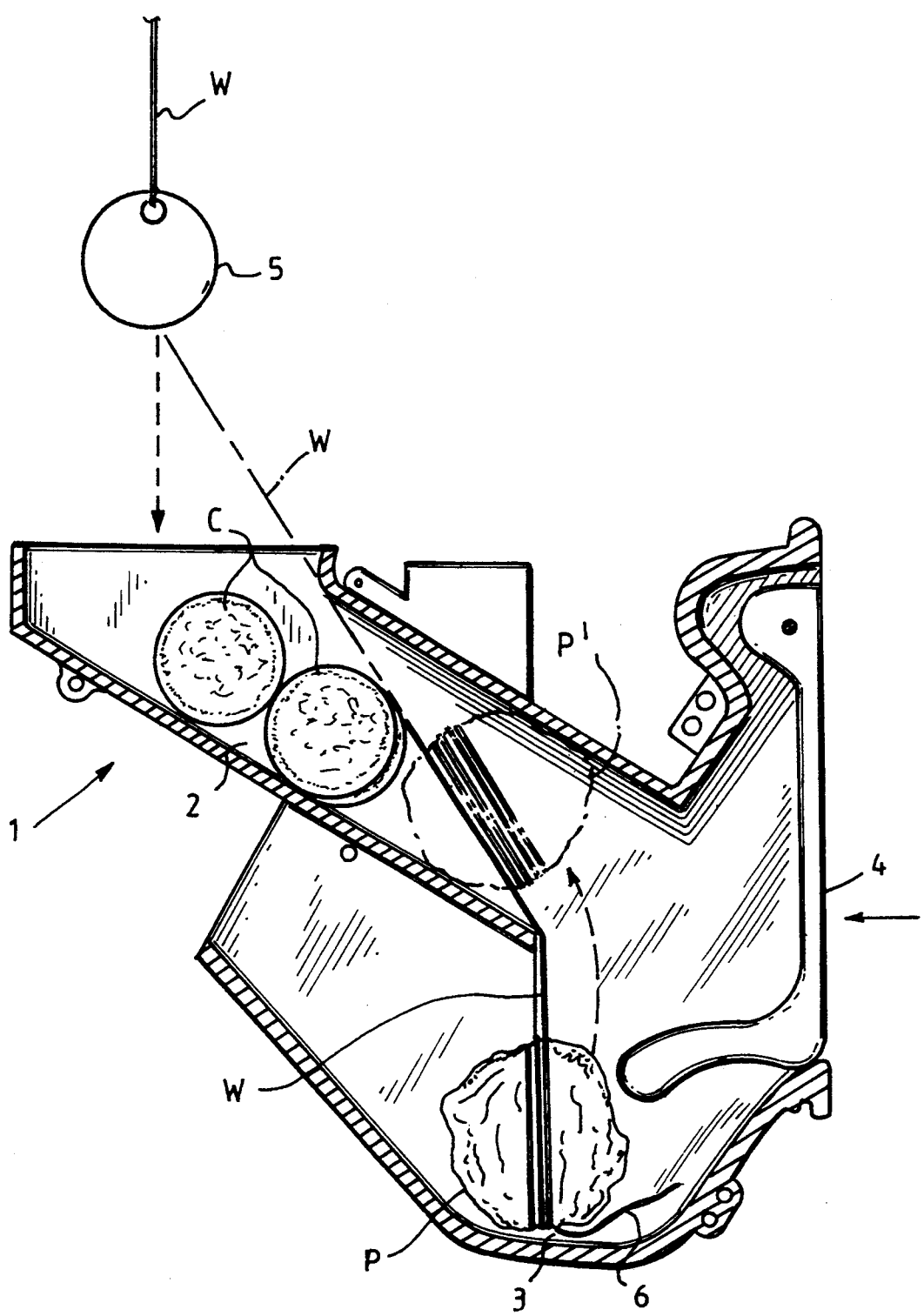
FIGS. 1 and 2 are sectional views of prior art, illustrating common devices for blocking the return channel.

Referring to the drawings (FIG. 1), a portion of a prior art pay phone 1, has a coin return channel 2. The coins C being returned flow down the return channel 2, to the receptacle 3, where they are returned to the user. The user presses in the door 4, with a finger and retrieves the coin, from the receptacle 3.

Thieves block the return channel 3, so that the coins will not be returned but will be trapped so that the thieves can extract them at a later time.

A common way to block the channel 2, is by means of a paper wad P. The wad P is inserted into the channel 2 as follows, a coin 5, with a wire W is inserted in the telephone and passed to the receptacle 3. The thief wraps wire W around a wad of paper P leaving a small tail 6. The wire W is then pulled up and a paper wad P is jammed in the position P' in the channel 2. Therefore, coins being returned will be blocked in the channel 2.(FIG. 1)

At a later time, the thief will pull the paper wad P down by means of the wire tail 6, and extract the coins which will fall down into the receptacle 3.

Figures 2, 2A:
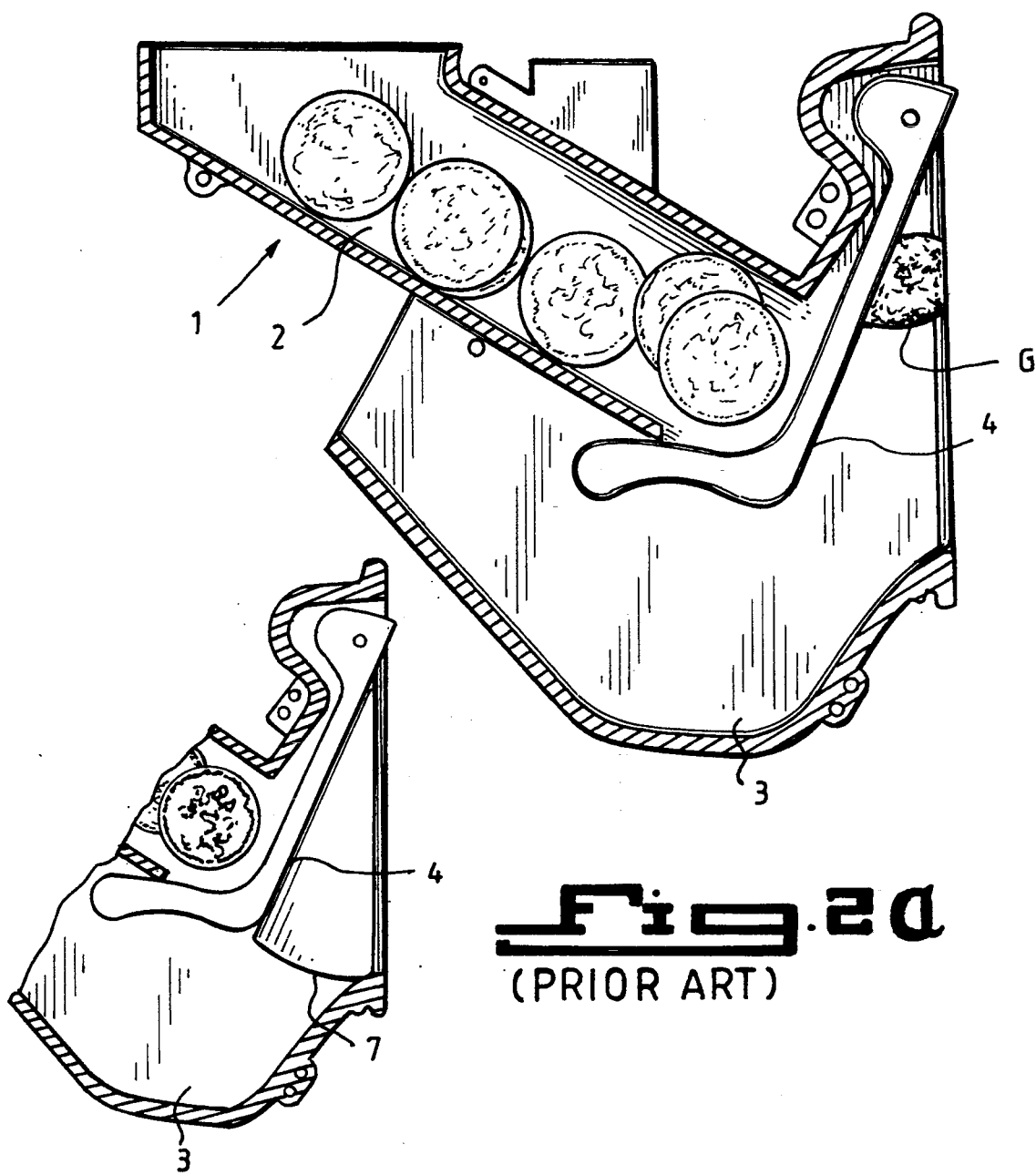
FIG. 2a is a detail of FIG. 2 showing another common device for preventing proper retrieval of coins.

FIG. 2 shows another method used in blocking the coin return channel 2. In this method a wad of gum G is used to block the door 4 in the position shown in FIG. 2, so that the coins will be blocked in the return channel 2. Instead of a wad of gum G, as shown in FIG. 2a the door 4 may be locked in the position shown in FIG. 2 by means of a triangular metal piece 7.

Figure 3:
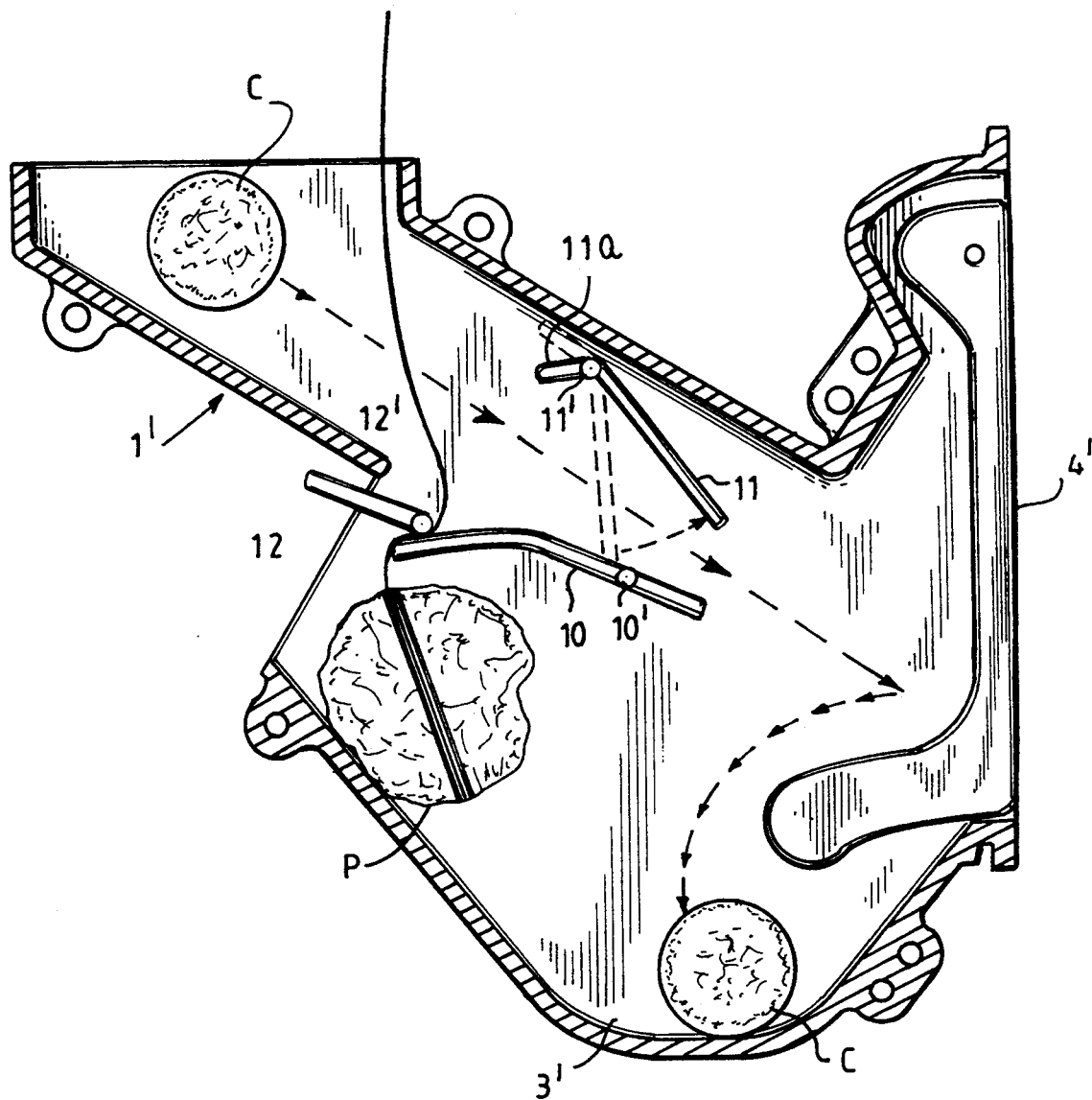
FIGS. 3 & 4 are sectional views showing an embodiment of the invention.
Figure 4:
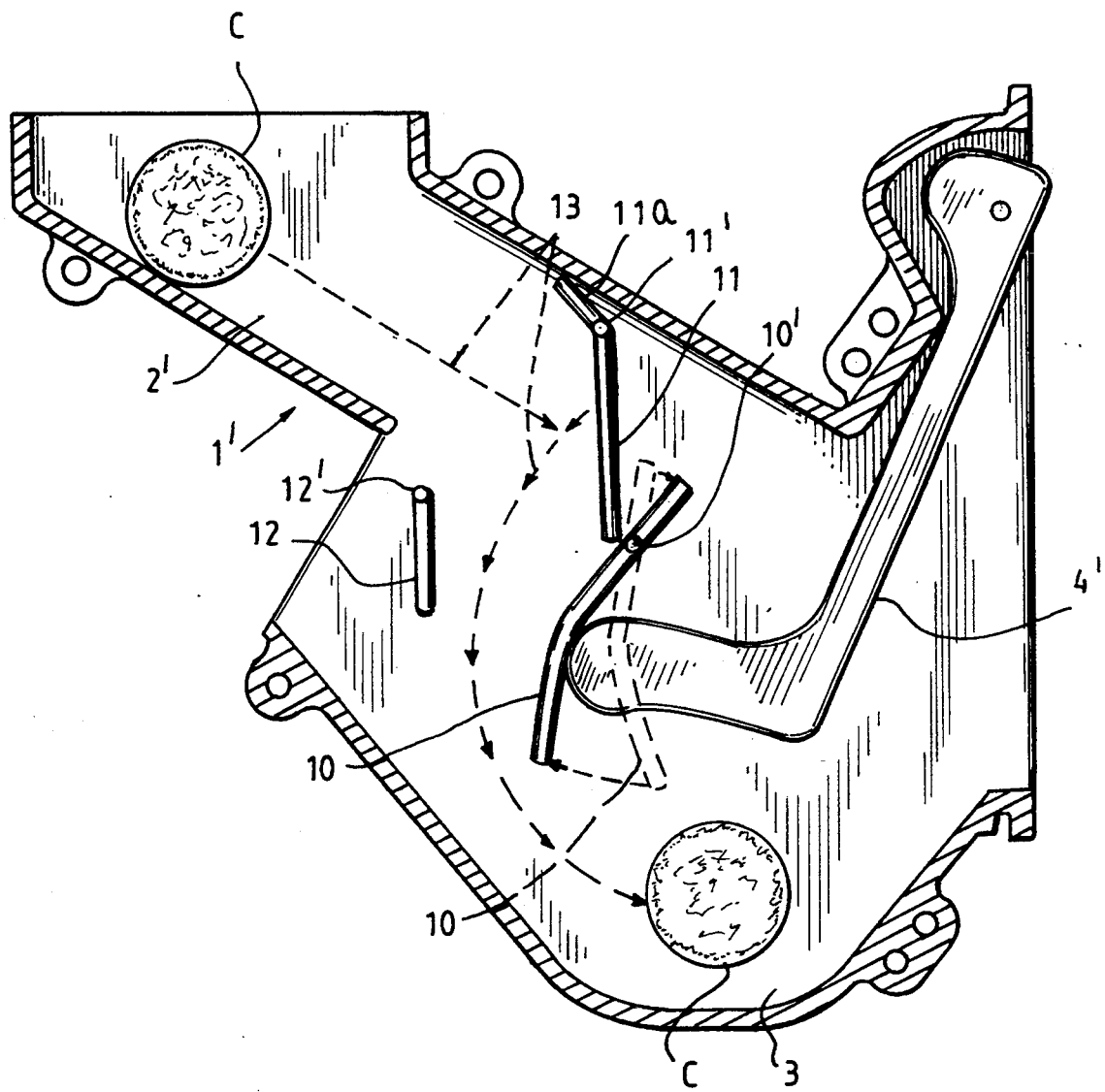

FIGS. 3 and 4 show sectional views of an embodiment of the invention used with telephone 1' comprising a first vane 10, pivotally mounted at the point 10', second vane 11, pivotally mounted at the point 11', and a third vane, 12, pivotally mounted at the point 12'. The vane 10 prevents the paper wad P from entering the coin return channel and blocks it in the position illustrated. The coins C will bypass the paper wad P and go to the receptacle 3' shown by the arrows.

The vane 11 has a small portion 11a which prevents it from rotating counter clockwise. The vane 11 can rotate clockwise as shown in FIG. 3 so that the coins will bypass the paper wad P and return to the receptacle 3'. The vane 12 will assume the position as shown in FIG. 3.

FIG. 4 illustrates how the door 4' is prevented from blocking the return channel 2', as illustrated in FIG. 2. In FIG. 4, the door 4' is blocked by the vane 10 and the coins C will follow the dotted path 13 and return to the receptacle 3'.

What is claimed is:

1. In a coin operated telephone having a coin retrieval receptacle, a coin return channel for discharging the coin into said coin retrieval receptacle, and a coin return door pivoted at its upper end for swing movement inwardly toward the coin discharge end of said coin return channel for providing finger access to the coin retrieval receptacle for the removal of said coin, the improvement comprising a pair of first and second vane means each pivotally mounted between said coin return channel and said coin retrieval receptacle each having a normal position permitting said coin to pass between said vane means from said coin return channel into said coin retrieval receptacle, said vane means each assuming an alternate position in response to the insertion of a foreign body to block said coin return channel, the alternate positions of said vane means forming a wall between said coin return channel and said coin retrieval receptacle and providing a bypass path for said coin to pass into said coin retrieval receptacle thereby defeating the effort to prevent the normal return of said coin.

2. The coin operated telephone of claim 1 having a third vane means pivotally mounted within said coin return channel for cooperating with said second vane means for permitting said coin to enter said coin retrieval receptacle even when said coin return door is blocked open.

* * * * *